United States Patent [19]

Reunamäki

[11] Patent Number: 5,123,943
[45] Date of Patent: Jun. 23, 1992

[54] HEATING, BENDING AND COOLING SYSTEM FOR GLASS

[76] Inventor: Pauli T. Reunamäki, Emännänkatu 17, SF-33820, Tampere, Finland

[21] Appl. No.: 674,357

[22] PCT Filed: Sep. 27, 1989

[86] PCT No.: PCT/FI89/00183
§ 371 Date: Apr. 12, 1991
§ 102(e) Date: Apr. 12, 1991

[87] PCT Pub. No.: WO90/03336
PCT Pub. Date: Apr. 5, 1990

[30] Foreign Application Priority Data

Sep. 28, 1988 [FI] Finland ............................. 884443

[51] Int. Cl.$^5$ .................... C03B 23/025; C03B 27/044
[52] U.S. Cl. ........................................ 65/268; 65/273; 65/287; 65/289
[58] Field of Search ................. 65/104, 107, 268, 273, 65/287, 289, 348, 349

[56] References Cited

U.S. PATENT DOCUMENTS

| | | | |
|---|---|---|---|
| 2,526,359 | 10/1950 | Jendrisak | 65/289 |
| 4,540,425 | 9/1985 | Bocelli et al. | 65/273 |
| 4,881,962 | 11/1989 | Reunamaki et al. | 65/104 |
| 4,957,531 | 9/1990 | McMaster et al. | 65/273 |

Primary Examiner—Joye L. Woodard
Attorney, Agent, or Firm—Larson and Taylor

[57] ABSTRACT

The present invention provides a heating, bending and cooling system for glass, which comprises a horizontally-standing bending mold located in an oven. The mold includes two or more hollow supporting elements which are separated from each other. At least one of the ends of each of the supporting elements extends out of the chamber of the oven through a plate. The upper part of the chamber of the oven includes at least one hollow upper element which acts as a heating and cooling element which can be lowered to a position above the supporting elements. The supporting elements not only support a glass sheet placed thereon but also bend the glass sheet when it is heated. The supporting elements also act as heating elements and cooling elements. In addition, the supporting elements are oscillated to keep the surfaces of the supporting elements touching the glass in constant motion.

5 Claims, 2 Drawing Sheets

HEATING, BENDING AND COOLING SYSTEM FOR GLASS

BACKGROUND OF THE INVENTION

1. Field of the Invention

The present invention relates to a system for heating, bending and cooling of glass.

2. Prior Art

A mold system used in the bending of glass has been described in U.S. Pat. No. 2,526,359. In this mold system, the bending mold is convex upwards and when the glass sheet is lowered over the mold, the glass sheet is supported by central parts of the mold. The mold includes two side template plates which position the pipes forming the mold at the desired bending curvature. The pipes are separated from each other at a constant distance by vertical members and the pipes can only move in vertical direction. The "pipe" mold is supported in its center by a brace, which can give support only in a vertical direction. To produce a desired shape of glass, the template plates and the middle located brace are replaced with templates and a brace, which are formed to give a desired shape of glass.

In U.S. Pat. No. 2,223,124 a method is described in which a horizontal glass plate is placed on a roll device, which in the beginning has horizontal rolls which are separately supported and are spaced apart from each other. While the glass is heated, these rolls are incrementally lowered and while these rolls are lowered, they give shape to the glass. By varying guidance of the rolls, one can produce different kind of shapes.

The aforementioned glass bending methods have many problems. In both methods the mold needs a heavy frame construction which causes a great deal of difficulty, because the frame is located in the oven, which is both heated and cooled.

In the construction shown in U.S. Pat. No. 2,256,359, the pipes have to be unbending, they are also heavy, because they are supported in axial direction only at their ends and in the middle they are only carried. The frame of the mold is not adjustable and the pipes used have to be full length even in case of small glass sheet bending. In a heavy mold different parts may warm up at different times and they may even remain at different temperatures, which causes distortions. Because the pipes are not supported in axial direction in the middle, it is particularly easy to get distortions in pipes.

In the construction shown in U.S. Pat. No. 2,223,124 it is troublesome to guide lowering of the roll devices, which is a very difficult operation and which must be done inside the oven. Because of construction of the roll device it is also impossible to make the mold smaller in any simple way when it is used with smaller glass sizes. In addition to this there is a special difficulty in using rolls, because this is done in a hot environment (about 600° C.) and shape of the roll devices is changing all the time.

The heating, bending and cooling system according to present invention provides a significant improvement over the prior art molds.

SUMMARY OF THE INVENTION

The present invention provides a heating, bending and cooling system for glass, which comprises a horizontally-standing bending mold located in an oven. The mold includes two or more hollow supporting elements which are separated from each other. At least one of the ends of each of the supporting elements extends out of the chamber of the oven through a plate. The upper part of the chamber of the oven includes at least one hollow upper element which acts as a heating and cooling element which can be lowered to a position above the supporting elements. The supporting elements not only support a glass sheet placed thereon but also bend the glass sheet when it is heated. The supporting elements also act as heating elements and cooling elements. In addition, the supporting elements are oscillated to keep the surfaces of the supporting element touching the glass in constant motion.

DETAILED DESCRIPTION OF THE INVENTION

Figure 1:
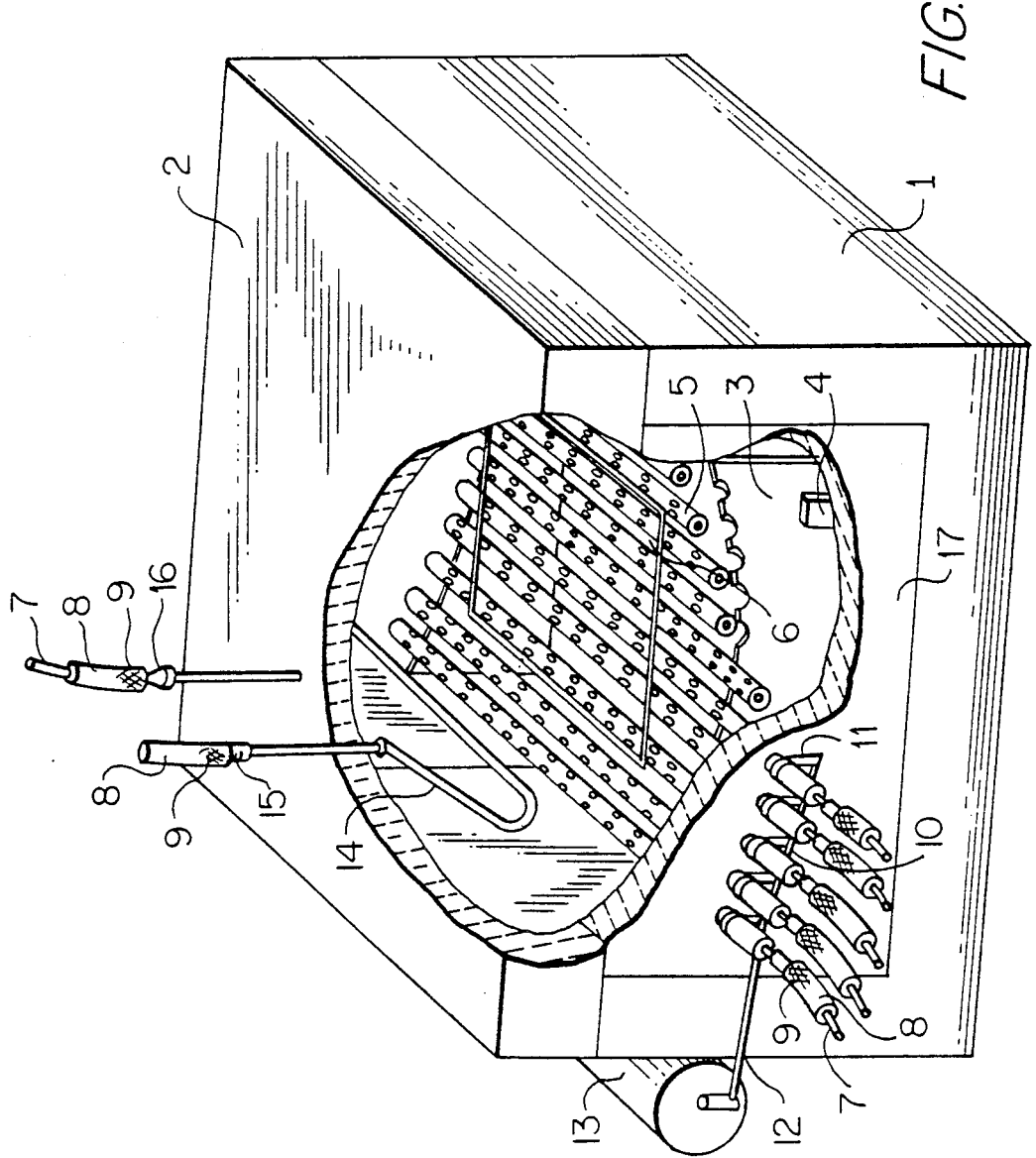
FIG. 1 is a perspective view of a heating, bending and cooling system for glass according to the invention with a portion of the system broken away to show interior detail.

As shown in FIG. 1 an oven 1 located bending mold system, consists of at least two template plates 3 which are supported in vertical position by supporting members 4. Upper edges of template plates 3 are constructed to support supporting elements or pipes 5 in an axial direction and to carry them. Pipes 5 act as bending mold for glass, and the form of the mold is determined by template plates 3. Ends of pipes 5 are extend through plates 17 out of the oven. Outside the oven, pneumatic air can be led through flexible pipes 7 to pipes 5 and electricity from a voltage source (not shown) can be directed through copper wire 9 to pipes 5. Pneumatic pipe 7 and copper wire 9 are coaxially integrated. Copper wire 9 is coated with insulating material 8. Oscillating/rotating movement is given to pipes 5 by a mechanism comprising a device 13 which moves back and forth a rod 12, causing a lever 11 of each pipe 5 to move the pipe 5 back and forth. Adjacent levers 11 are connected by rods 10. The glass sheet 6 to be bent is laid over pipes 5. Pipes 5 can act as heating device of glass with electricity which is led to pipes 5. While glass 6 is heated and molded by pipes 5, the pipes 5 can be given an oscillating movement to prevent the formation of contact marks in the surface of glass 6. After glass 6 is molded, pressurized air is blown out of holes 26 in pipes 5 and in this way glass 6 is cooled. The number of pipes 5 used can be variable. Glass sheet (6) can also be electrically heated and pneumatically cooled by one or more upper element 14. Upper element 14 can be lowered near to glass sheet 6 to a distance of about 5–20 cm and element 14 can be moved during its functioning.

Figure 2:
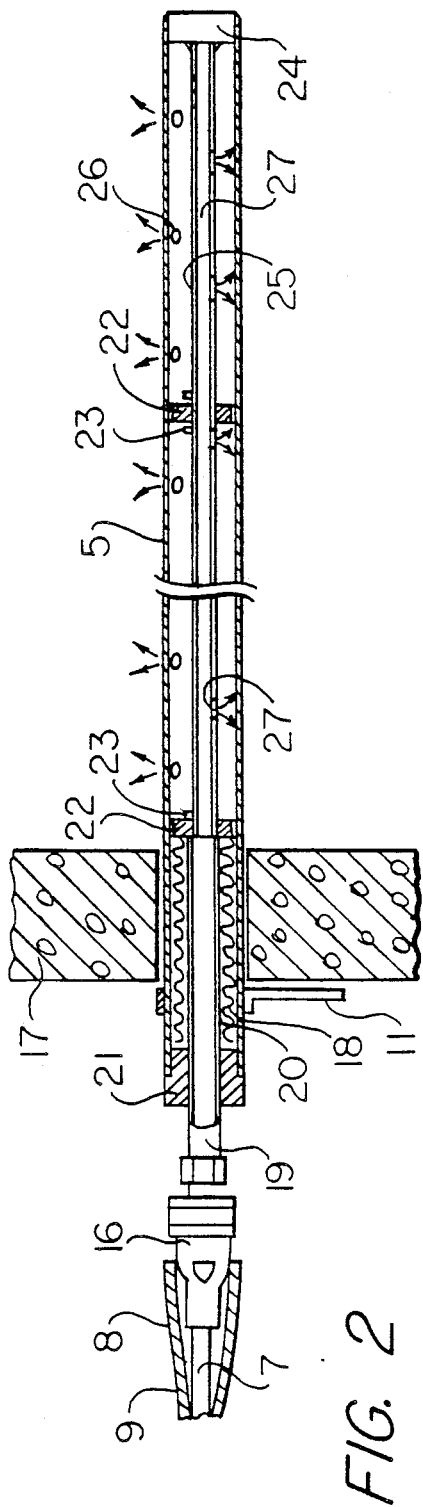
FIG. 2 shows a supporting element according to the invention.

In FIG. 2 there is shown one of a group of the pipes 5 which forms a bending mold. The pipe 5 consists of an inner pipe 25 which at one end is mounted in end member 24. Because of thermal expansion, inner pipe 25 is separated by sliding ceramic spacers 22 from outer pipe 5. Movement of spacers 22 on inner pipe 25 is prevented stops 23. The walls of inner pipe 25 are thin and inner pipe 25 becomes hot when electricity goes through it, so pipe 5 can be used as heating element. The walls of inner pipe 19 are thick and it is a good conductor of electricity, so it doesn't get warm when electricity travels through it to inner pipe 25. Electricity is directed to pipe 19 through copper wire 9 and quick joining part 16. From the end member 24 electricity travels through outer pipe 5 to the frame of mold 20. Pressurized air is directed to pipes 19 and 25 through pipe 7 and quick joining part 16. End member 21 prevents leaks of pressurized air. Highly pressurized air flows through inner pipes and out through holes 27 into the space between pipes 5 and 7 where the pressure of the air is stabilized and the air flows smoothly through holes to glass sheet 6. Lever 11 is joined to an end of pipe 5 with band 18. In the pipe 5 there is a guidance hole (not shown) that helps to adjust lever to the correct position relative to holes 26. Lever 11 moves pipe 25 back and forth. In the pipe 5 holes 26 are in two lines that are arranged so that neither of the two hole lines can be turned so much that it would face a surface of glass sheet 6 while the pipe 5 is oscillated.

Figure 3:
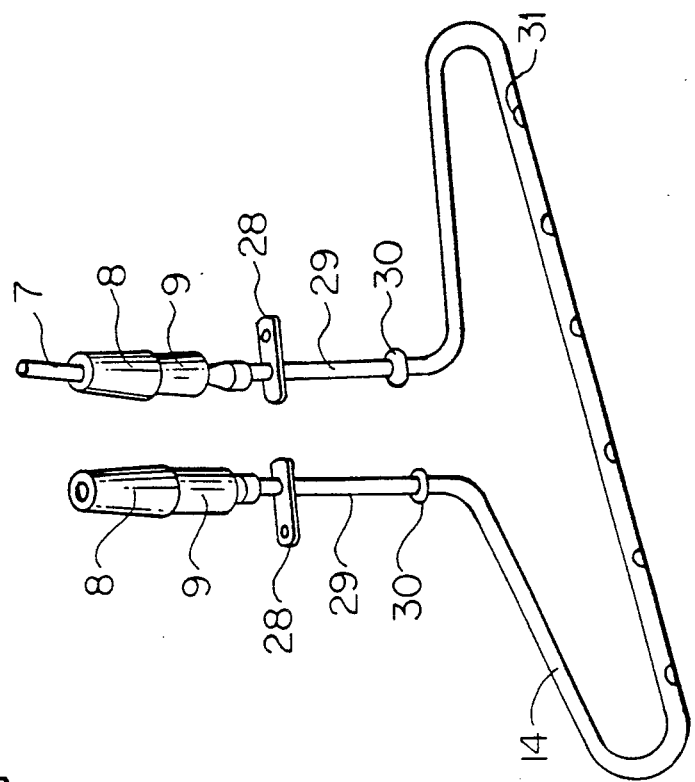
FIG. 3 shows an upper element according to the invention.

In FIG. 3 there is shown an upper element 14, which receives electricity through copper wires 9 and pipe 29 which are good conductors of electricity. However, pipe section 14 gets warm when electricity passes through it and acts as heater. The composition of the pipe formed by pipe 29 and upper element 14 changes at a point 30 from being more conductive to being less conductive. Pressurized air is blown out of holes to cool glass sheet 6. Fixtures 28 can be used to fix upper element 14 to fix upper element 14 to a device which moves upper element 14 in a vertical direction.

While only some embodiments of the present invention have been described in detail herein, various modifications and changes may be applied without departing from the scope of the invention.

I claim:

1. A heating, bending and cooling system for glass comprising:

an oven having a chamber therein including at least one vertical plate;

hollow supporting elements extending in a horizontal direction within said chamber and having at least one end which extends out of said chamber through said at least one vertical plate, said hollow supporting elements being arranged to bend a sheet of a glass placed thereon when the glass is heated, each of said hollow supporting elements including a first heating means for heating glass located thereon and a cooling means for cooling glass located thereon;

at least one plate for supporting said hollow supporting elements in said bending arrangement;

means for oscillating said hollow supporting elements in a direction perpendicular to the direction in which said hollow supporting elements extend; and an upper element located above said hollow supporting elements for heating the sheet of glass located on said hollow supporting elements, and means for lowering said upper element over the sheet of glass.

2. A heating, bending and cooling system for glass according to claim 1, wherein said first heating means comprises an inner pipe located within each said hollow supporting element, said inner pipe being electrically heated.

3. A heating, bending and cooling system for glass according to claim 1, wherein said upper element comprises a bent pipe which is electrically heated.

4. A heating, bending and cooling system for glass according to claim 1, wherein said hollow supporting elements include holes extending therethrough and said cooling means comprises means for supplying pressurized air through said hollow supporting elements and out of said hollow supporting elements through said holes.

5. A heating, bending and cooling system for glass according to claim 1, wherein said upper element is hollow, includes second holes extending therethrough and includes second cooling means comprising means for supplying pressurized air through said hollow supporting elements and out of said hollow upper element through said second holes.

* * * * *